US009998060B2

(12) United States Patent
Tao et al.

(10) Patent No.: US 9,998,060 B2
(45) Date of Patent: Jun. 12, 2018

(54) SYSTEM AND METHOD FOR CAPACITOR FAULT ENERGY INTERRUPTION IN ADJUSTABLE SPEED DRIVES

(71) Applicant: Eaton Corporation, Cleveland, OH (US)

(72) Inventors: Tony Tao, Shenzhen (CN); Xiaoling Li, Shenzhen (CN); Huaqiang Li, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 104 days.

(21) Appl. No.: 15/248,544

(22) Filed: Aug. 26, 2016

(65) Prior Publication Data
US 2018/0062557 A1 Mar. 1, 2018

(51) Int. Cl.
*H02P 27/06* (2006.01)
*H02P 29/024* (2016.01)
*H02P 27/08* (2006.01)
*H02K 17/30* (2006.01)

(52) U.S. Cl.
CPC ........... *H02P 29/024* (2013.01); *H02K 17/30* (2013.01); *H02P 27/08* (2013.01)

(58) Field of Classification Search
CPC ..... H02M 1/32; H02M 5/4585; H02P 29/025; H02P 27/06; H02P 27/08; H02P 27/04; H02P 29/024; H02P 3/12; H02P 3/22; H02K 11/33
See application file for complete search history.

(56) References Cited

U.S. PATENT DOCUMENTS

| 8,796,982 B2* | 8/2014 | Li | H02P 23/12 318/706 |
| 8,816,625 B2* | 8/2014 | Kopiness | H02M 1/36 318/376 |
| 9,294,024 B2* | 3/2016 | Ooi | H02H 11/005 |

(Continued)

OTHER PUBLICATIONS

UL Standard 61800-5-1, Standard for Adjustable Speed Electrical Power Drive Systems—Part 5-1: Safety Requirements—Electrical, Thermal and Energy, Jun. 8, 2012.

(Continued)

*Primary Examiner* — Bentsu Ro
*Assistant Examiner* — Thai Dinh
(74) *Attorney, Agent, or Firm* — Ziolkowski Patent Solutions Group, SC

(57) ABSTRACT

An adjustable speed drive (ASD) circuit includes a rectifier bridge to convert an AC power input to a DC power, a DC link coupled to the rectifier bridge to receive the DC power, a DC link capacitor bank comprising at least first and second capacitors connected to the DC link, each capacitor having a capacitor voltage thereacross, and a protection circuit including a detection circuit configured to detect a short circuit on one or more of the first and second capacitors of the DC link capacitor bank and generate an action signal upon detection of a short circuit on one or more of the first and second capacitors of the DC link capacitor bank. The ASD circuit also includes an action circuit in operable communication with the detection circuit and configured to cause a short circuit across the DC link upon receiving the action signal from the detection circuit.

20 Claims, 9 Drawing Sheets

(56) References Cited

U.S. PATENT DOCUMENTS

2008/0186750 A1\* 8/2008 Gilmore .................. H02M 1/36
363/129
2013/0293988 A1\* 11/2013 Li ........................ H02P 29/027
361/30

OTHER PUBLICATIONS

"Find the Right Fuse!", Schurter Electronic Components, pp. 1-4, Jan. 2013.
Application Guide 10507, Protecting Semiconductors with High Speed Fuses, Eaton, Jun. 2016, pp. 1-36.

\* cited by examiner

US 9,998,060 B2

SYSTEM AND METHOD FOR CAPACITOR FAULT ENERGY INTERRUPTION IN ADJUSTABLE SPEED DRIVES

BACKGROUND OF THE INVENTION

The present invention relates generally to adjustable speed drive (ASD) circuits and, more particularly, to a system and method for minimizing and interrupting capacitor fault energy in ASD circuits to protect the electrolytic DC link capacitors from being damaged by a fault condition.

One type of system commonly used in industry that performs power conversion is an ASD circuit, also known as a variable frequency drive (VFD) circuit. An ASD is an industrial control device that provides for variable frequency, variable voltage operation of a driven system, such as an AC induction motor. A typical ASD circuit 10 is illustrated in FIG. 1. ASD or VFD circuit 10 includes an electromagnetic interference (EMI) filter 12 provided between a drive input 14 and input rectifier terminals 16. The terminals are connected to a rectifier bridge 18 that converts an AC input power provided at drive input 14 into a DC power, with the rectifier bridge 18 being in the form of an "uncontrolled" rectifier bridge that includes an arrangement of six diodes 20—with a pair of diodes 20 arranged in series on each of the three input phases. The ASD circuit 10 additionally includes a DC link 22 that receives the DC power from rectifier bridge 18; a DC link capacitor bank 24 having two capacitors 26, 28 across DC link 22; two inductors 30 coupled in series with and on either side of the rectifier bridge 18 on DC link 22; a pre-charge circuit 32 to control and limit inrush current into DC link capacitor bank 24 during power up; a brake chopper 34 to discharge the DC link capacitor bank 24; an inverter 36 to convert the DC power to AC power; and an output 38 coupled to the inverter 36.

While the above described architecture of the ASD circuit 10 allows for efficient operation thereof, the ASD circuit lacks sufficient protection against various internal and external fault conditions that could damage ASD circuit. One internal fault condition that occurs in ASD circuits is a short circuit across a DC capacitor in a DC capacitor bank, such as DC capacitor bank 24. A capacitor may develop a short circuit for a variety of reasons including, for example, high temperatures, mechanical damage, aging, or a power disturbance such as a power surge or a voltage transient. Breakdown of components tests on the ASD circuit, such as those performed to determine compliance of the circuit under Standard UL61800-5-1, may also cause a short circuit across a capacitor. In any case, a short circuit across a capacitor in an ASD circuit will cause the ASD circuit to fail and, if power is allowed to continue to flow to the capacitor bank when one capacitor has a short circuit, an overvoltage condition will exist on the non-shorted capacitor. This overvoltage condition may, in electrolytic capacitors, cause the non-shorted capacitor to catch on fire and possibly explode.

As constructed in the embodiment of FIG. 1, ASD circuit 10 includes a pair of resistors 40 arranged in parallel with capacitors 26, 28 across the DC link 22 in order to mitigate damage to the capacitors 26, 28. However, the resistors 40 are not adequate to fully protect the capacitors, as the resistors cannot prevent power from continuing to flow to a shorted capacitor in DC capacitor bank 24. That is, as diodes 20 of rectifier bridge 18 cannot be controlled to turn off, power can continue to pass through rectifier bridge 18 to DC capacitor bank 24 while a capacitor is shorted. The overvoltage condition on the non-shorted capacitor will cause ASD circuit 10 to be damaged, such that the damaged ASD circuit 10 will not be useable and a user will have to make costly repairs to the ASD circuit or replace the ASD circuit. The user will incur additional economic losses during the downtime period when ASD circuit 10 is not in use.

It would therefore be desirable to provide a system and method for protecting an ASD circuit against fault conditions that could damage the ASD circuit. It would also be desirable for such a system and method to prevent the ASD circuit from catching fire, according to the requirements of Standard UL61800-5-1.

BRIEF DESCRIPTION OF THE INVENTION

Embodiments of the present invention provide a system and method for minimizing and interrupting capacitor fault energy in ASD circuits to prevent DC link electrolytic capacitors from catastrophic failures by a fault condition, such as a capacitor short circuit.

In accordance with one aspect of the invention, an ASD circuit includes an input connectable to an AC source, a rectifier bridge connected to the input to convert an AC power input to a DC power, a DC link coupled to the rectifier bridge to receive the DC power therefrom, a DC link capacitor bank comprising at least first and second capacitors connected to the DC link, each capacitor of the DC link capacitor bank having a capacitor voltage thereacross, and a protection circuit including a detection circuit configured to detect a short circuit on one or more of the first and second capacitors of the DC link capacitor bank and generate an action signal upon detection of a short circuit on one or more of the first and second capacitors of the DC link capacitor bank. The ASD circuit also includes an action circuit in operable communication with the detection circuit and configured to cause a short circuit across the DC link upon receiving the action signal from the detection circuit.

In accordance with another aspect of the invention, a method of operating an adjustable speed drive (ASD) circuit that comprises a rectifier, a DC link having a DC link capacitor bank with first and second capacitors, a protection circuit, and an inverter is provided. The method includes receiving an AC power at an input of the ASD circuit, providing the AC power to the rectifier to convert the AC power to a DC power on the DC link, detecting a short circuit on a capacitor of the DC link capacitor bank via a detection circuit of the protection circuit, generating an action signal via the detection circuit upon detection of a short circuit on a capacitor of the DC link capacitor bank, and causing a short circuit across the DC link via an action circuit of the protection circuit responsive to receiving the action signal at the action circuit.

In accordance with yet another aspect of the invention, an ASD circuit includes a rectifier bridge and a DC link coupled to the rectifier bridge to receive a DC link voltage therefrom, the DC link having a DC link capacitor bank thereon that includes at least two capacitors. The ASD circuit also includes a protection circuit having a detection circuit and an action circuit. The detection circuit is configured to sense a voltage across one or more of the at least two capacitors, determine if the sensed voltage across the one or more of the at least two capacitors crosses a voltage threshold, and generate an action signal upon determining that the sensed voltage across the one or more of the at least two capacitors has crossed the voltage threshold, wherein generation of the action signal indicates that a capacitor short circuit is present on one or more of the at least two capacitors. The action circuit is configured to cause a short circuit across the DC link upon receiving the action signal from the detection circuit, the short circuit across the DC link diverting energy from the at least two capacitors so as to limit damage thereto resulting from the capacitor short circuit.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a system and method for preventing DC link electrolytic capacitors from being damaged by a fault condition using a protection circuit that includes a detection circuit and associated action circuit. Embodiments of the system and method disclosed differ from prior art systems by monitoring, via a detection circuit, voltage and or current conditions on a capacitor bank across the DC link to detect a short circuit. If a short circuit is detected, an action circuit in operable communication with the detection circuit operates to short circuit the DC link, so as divert energy from the capacitor bank and limit the damage thereto.

Figure 1:
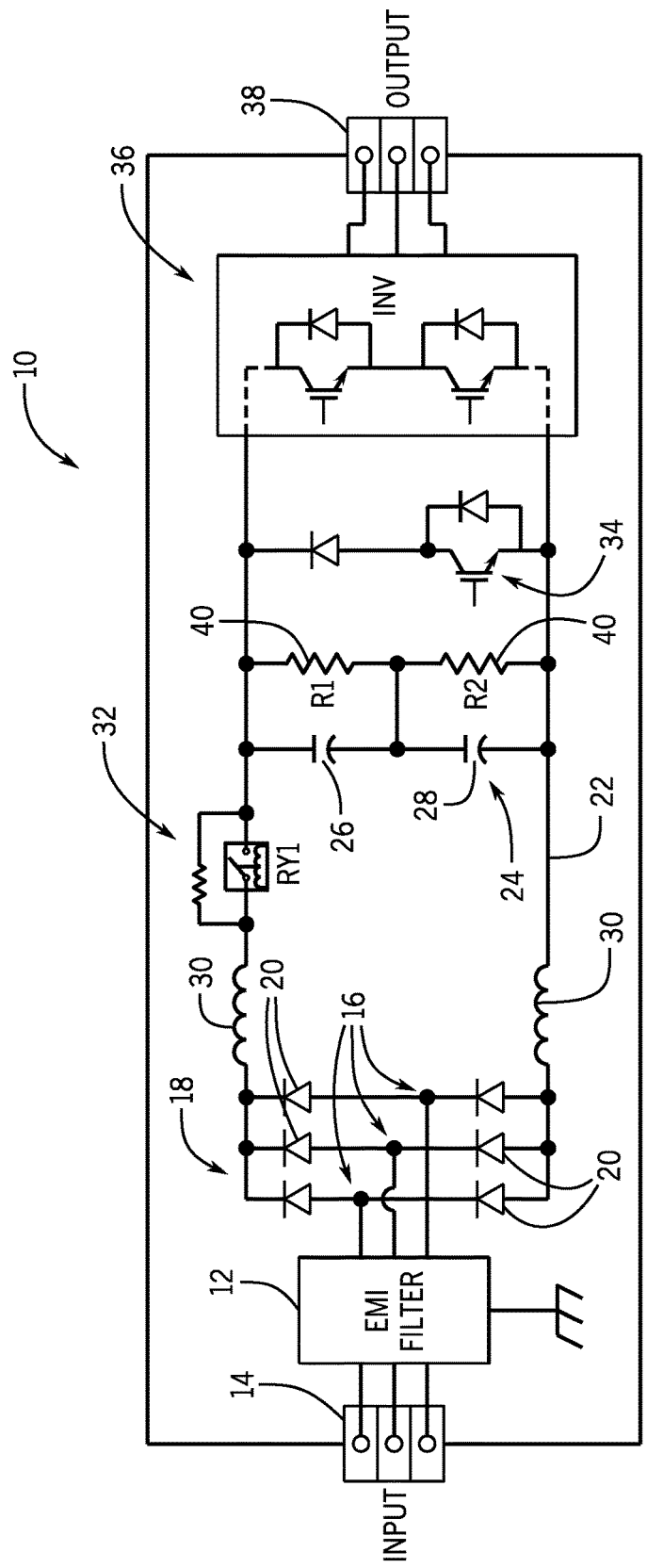
FIG. 1 is a schematic diagram of an ASD circuit, as known in the prior art.
Figure 2:
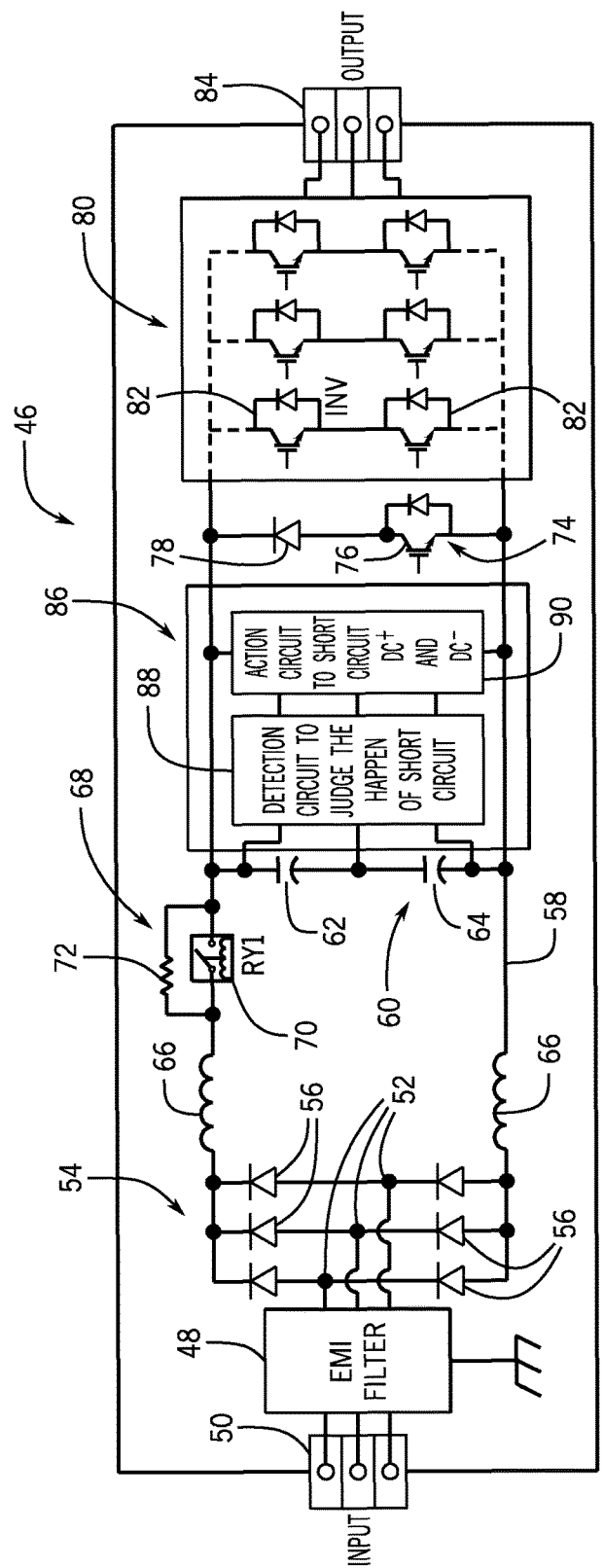
FIG. 2 is a schematic diagram of an ASD circuit, according to an embodiment of the invention.

Referring to FIG. 2, an ASD or VFD circuit 46 is illustrated according to an exemplary embodiment of the invention. The ASD circuit 46 includes an electromagnetic interference (EMI) filter 48 provided between a drive input 50 and input rectifier terminals 52. The terminals are connected to a rectifier bridge 54 that converts an AC input power provided at drive input 50 (such as, for example, from a utility grid) into a DC power, with the rectifier bridge 54 being in the form of an "uncontrolled" rectifier bridge that includes an arrangement of six diodes 56—with a pair of diodes 56 arranged in series on each of the three input phases.

ASD circuit 46 additionally includes a DC link or bus 58 that receives the DC power from rectifier bridge 54 and a DC link capacitor bank 60 with two capacitors 62, 64 across DC link 58 to provide smoothing to the DC link voltage, with this smoothed voltage then being provided to an inverter 80. According to one embodiment, capacitors 62, 64 each have the same capacitance. While capacitor bank 60 is shown with only two capacitors 62, 64, capacitor bank 60 may include additional capacitors connected in series or parallel with capacitors 62, 64 as needed. Two inductors 66 are coupled in series with and on either side of rectifier bridge 54, with a pre-charge circuit 68 being provided and coupled in series with one of the inductors to control and limit inrush current into the DC link capacitor bank 60 during power up (when drive input 14 is initially coupled to an AC input power). The pre-charge circuit 68 is formed of a pre-charge relay 70 (RY1) arranged in parallel with a pre-charge resistor 72. Pre-charge relay 70 of pre-charge circuit 68 may be operated by a controller (not shown) to control a current flow through the resistor 72 so as to control an initial pre-charge of the DC link capacitor bank 60.

According to one embodiment, a brake chopper 74 may be included in ASD circuit to discharge the DC link capacitor in a controlled manner. The brake chopper includes a solid state switch (e.g., IGBT) 76 and diode 78 arranged in series, with the IGBT being selectively controllable to cause the brake chopper 74 to discharge the DC link capacitor, with the voltage from the brake chopper 74 then being provided to an inverter 80 coupled to the DC link. The inverter 80 is composed of an arrangement of solid state switching devices, such as IGBT switches 82, and anti-parallel diodes, that collectively form a PWM inverter that synthesizes AC voltage waveforms with a variable frequency and amplitude for delivery to output 84 of inverter 80, so as to provide a controlled three-phase power to a load driven thereby (e.g., AC motor).

As shown in FIG. 2, ASD circuit 46 further includes a protection circuit 86 that operates to protect ASD circuit 46 from being damaged by a fault condition. The protection circuit 86 includes a detection circuit 88 operable to identify a fault condition in/across the capacitors 62, 64 and an action circuit 90 operable to initiate a protection scheme for the ASD circuit 46 responsive to a fault condition for the capacitors 62, 64. More specifically, the detection circuit 88 monitors a voltage and/or current across each of the capacitors 62, 64 in order to detect the presence of a short circuit, while the action circuit 90 functions to short circuit the DC link 58 upon detection of a short circuit, according to one of various components and/or control schemes utilized in the ASD circuit 46.

Figure 3:
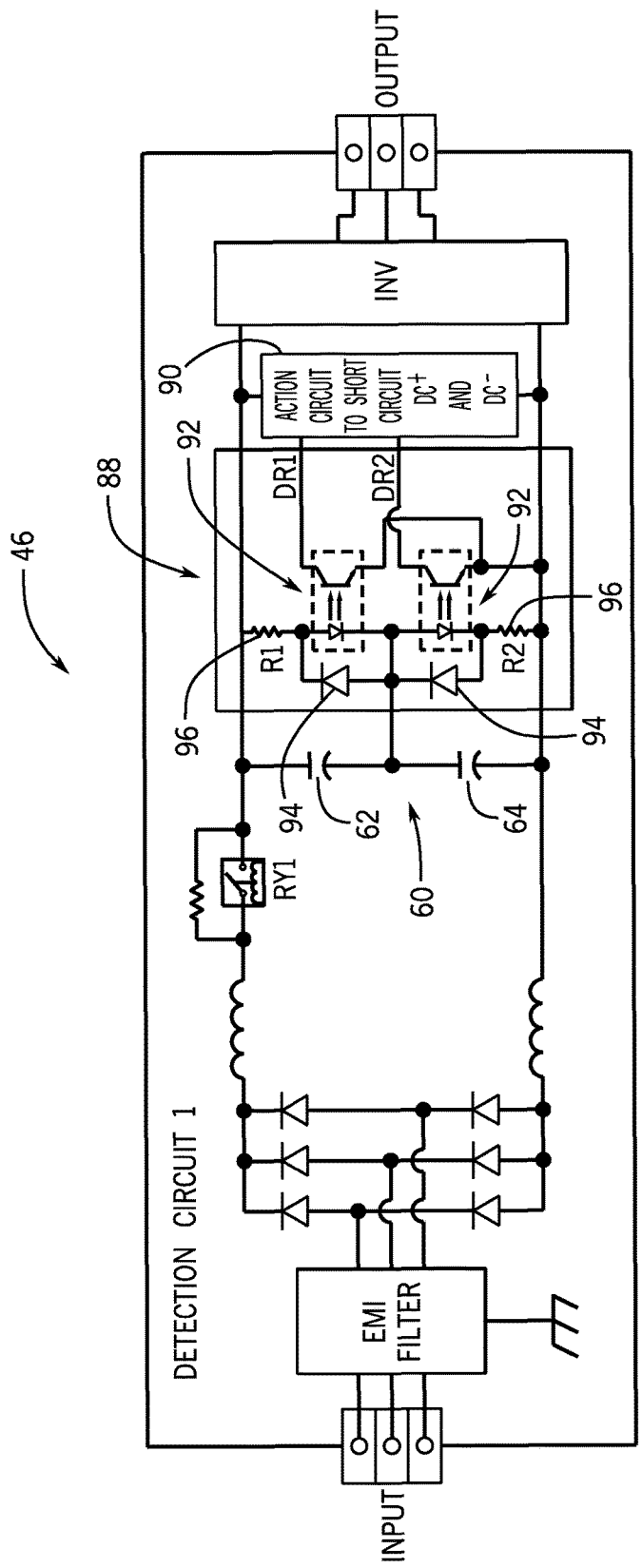
FIGS. 3 and 4 are schematic diagrams illustrating various detection circuit 88s incorporated into the ASD circuit of FIG. 2, according to embodiments of the invention.
Figure 4:
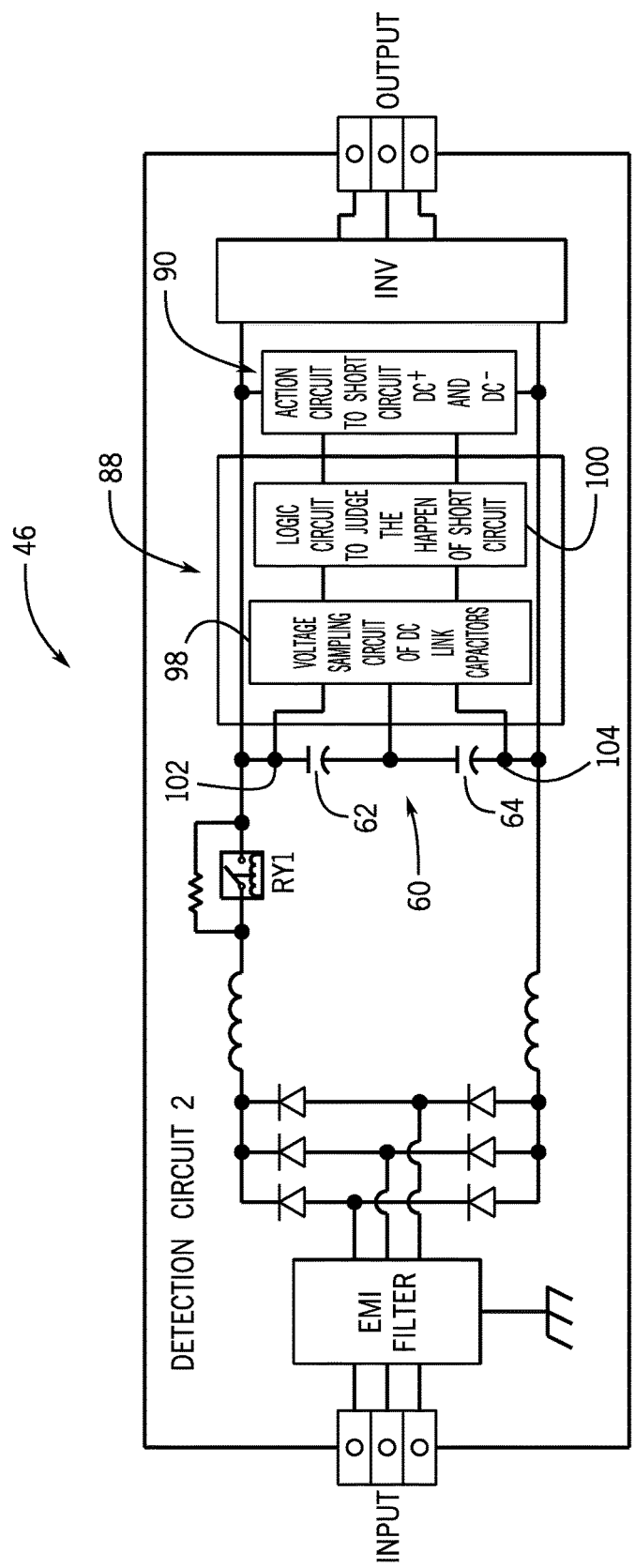
Figure 5:
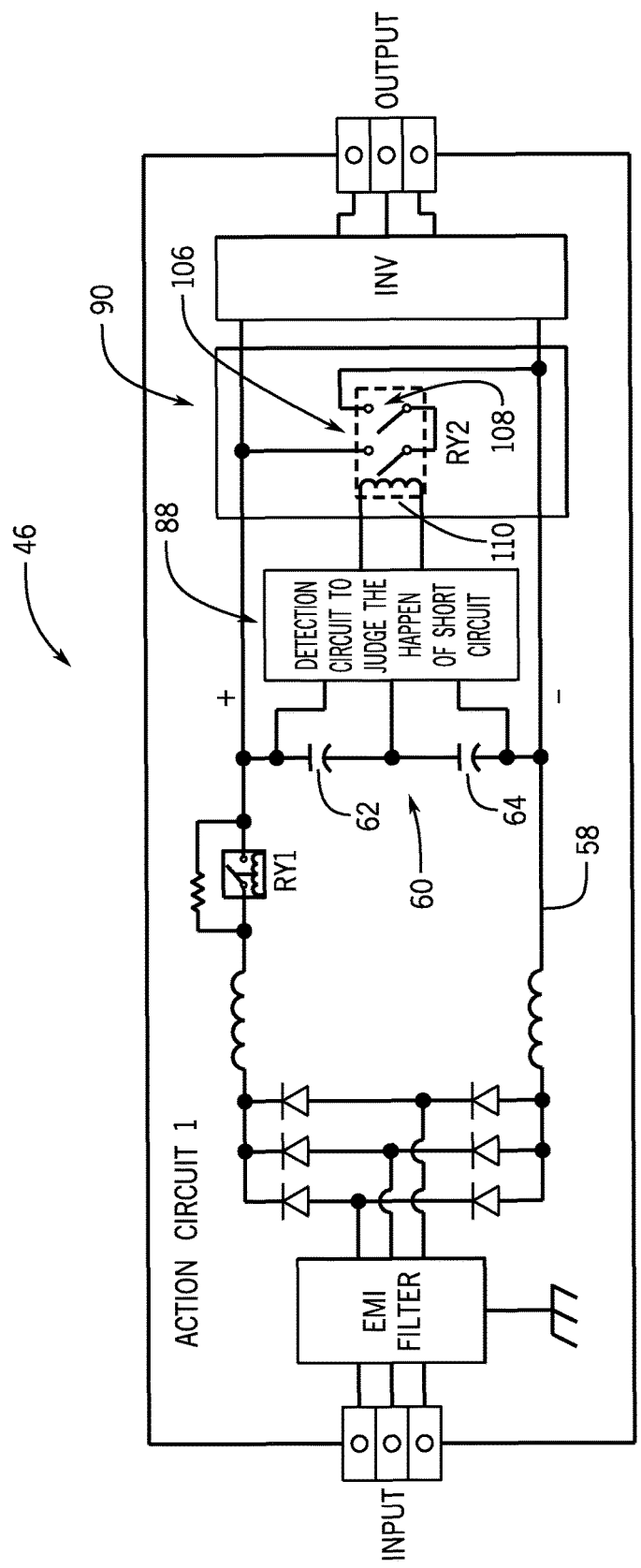
FIGS. 5-7 are schematic diagrams illustrating various action circuit 90s incorporated into the ASD circuit of FIG. 2, according to embodiments of the invention.
Figure 6:
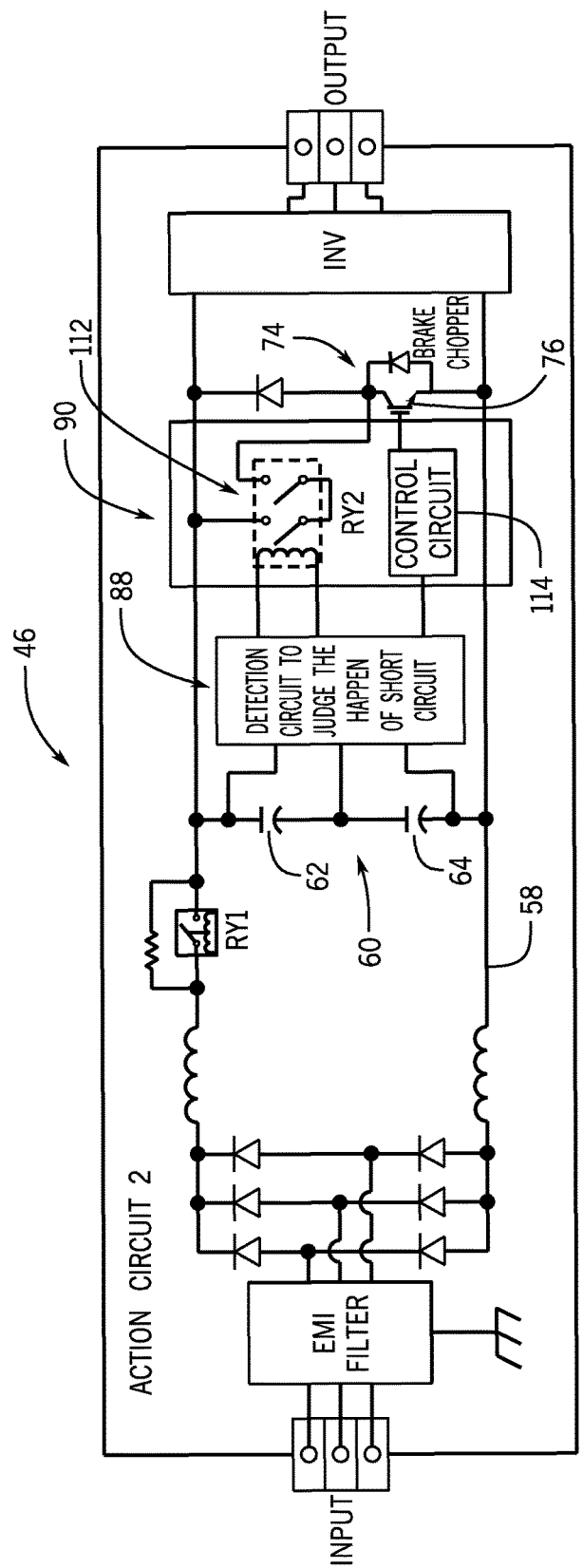
Figure 7:
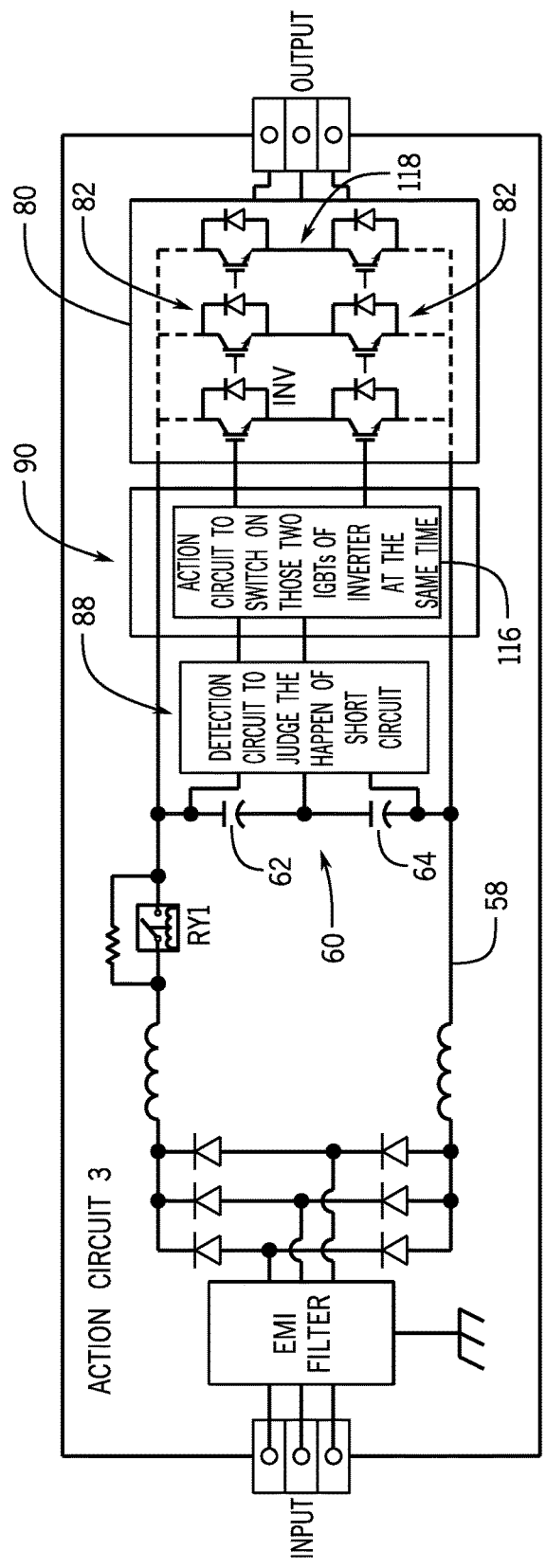

Referring now to FIGS. 3 and 4 and to FIGS. 5-7, various embodiments of the detection circuit 88 and the action circuit 90, respectively, that might be incorporated into or utilized by ASD circuit 46 are shown. Referring first to FIGS. 3 and 4, embodiments of different detection circuits 88 that might be incorporated into or utilized by ASD circuit 46 are shown. In a first embodiment, and as shown in FIG. 3, the detection circuit 88 may include a pair of opto-couplers 92 and associated diodes 94 and voltage-sharing resistors 96—with each of the resistors 96 being positioned in series with its respective diode 94 and opto-coupler 92. The opto-couplers 92 function to selectively generate and transmit signals based on a condition of the capacitors 62, 64, with each of the opto-couplers 92 having a known construction that includes an opaque package that houses a light source that converts electrical input signal into light (e.g., LED), a sensor that detects incoming light and generates an output signal responsive thereto (e.g., phototransistor or photodiode), and a dielectric optical coupling barrier positioned therebetween.

In operation, each of the opto-couplers 92 operates with an associated one of the capacitors 62, 64 to detect the occurrence or presence of a short circuit condition therein. The opto-couplers 92 receive inputs from their respective capacitors 62, 64 that dictate a resulting output generated by the opto-couplers 92. More specifically, if the voltage of a capacitor 62, 64 exceeds a pre-determined voltage threshold, the output of its associated opto-coupler 92 will be pulled to ground and cause a signal (i.e., "action signal") to be generated and output to the action circuit 90, indicating that a short circuit is present in one of capacitors 62, 64 and that a corresponding action should be taken by action circuit 90 to limit the damage done to the capacitors 62, 64 by this short circuit condition. In one embodiment, the pre-determined voltage threshold may be set approximately 50-100 volts (V) from a nominal capacitor bank voltage and a short circuit voltage, respectively. Thus, for example, if the nominal voltage across capacitor bank 60 is 650V, both capacitors 62, 64 should have 325V thereacross and, if capacitor 64 is shorted, then the entire 650V drop would be across capacitor 62, and the overvoltage threshold could be set to about 550-600V.

In a second embodiment, and as shown in FIG. 4, the detection circuit 88 may include a voltage sampling or sensing circuit 98 and an associated logic circuit 100. The voltage sampling circuit 98 includes voltage sensors 102 positioned on capacitor bank 60 that measure the voltage across capacitor 62. As shown in FIG. 4, according to one embodiment, voltage sampling circuit 98 may also include an optional voltage sensor 104 so that the voltage across capacitor 64 may be measured as well. Voltage sampling circuit 98 may include additional sensors depending on the number of capacitors in capacitor bank 60.

In detecting a short circuit in capacitor bank 60, logic circuit 100 compares the voltage across capacitor 62 received from voltage sampling circuit 98 to a voltage threshold or limit such as, for example, an overvoltage threshold or an undervoltage threshold. If the voltage across capacitor 62 crosses or passes the voltage threshold, logic circuit 100 detects a shorted capacitor in capacitor bank 60 and generates and transmits an output signal to action circuit 90. In some embodiments, logic circuit 100 compares the voltage across capacitor 62 to both an overvoltage voltage threshold and an undervoltage threshold. The overvoltage and undervoltage thresholds may be set approximately 50-100 volts (V) from a nominal capacitor bank voltage and a short circuit voltage, respectively. For example, if the nominal voltage across capacitor bank 60 is 650V, both capacitors 62, 64 should have 325V thereacross. If capacitor 64 is shorted, then the entire 650V drop would be across capacitor 62, and the overvoltage threshold could be set to about 550-600V. If capacitor 62 develops a short circuit, then the voltage across capacitor 62 would drop to 0V, and the undervoltage threshold could be set to about 50-100V.

In various embodiments, the voltage across both capacitors 62, 64 may be measured by voltage sampling circuit 98. In one embodiment, logic circuit 100 compares the voltages across capacitors 62, 64 to voltage thresholds, such as, for example, the overvoltage and/or undervoltage thresholds described above. In another embodiment, logic circuit 100 calculates the difference between the voltage across capacitor 62 and the voltage across capacitor 64 and compares that difference to a voltage threshold. If the difference between the voltage across capacitor 62 and the voltage across capacitor 64 is greater than the voltage threshold, then the logic circuit 100 generates and transmits an output signal to action circuit 90.

Referring now to FIGS. 5-7, embodiments of different action circuits 90 that might be incorporated into or utilized by ASD circuit 46 are shown. In a first embodiment, and as shown in FIG. 5, the action circuit 90 may include a protection relay 106 (RY2) connected to the positive and negative rails of the DC link 58 and in operable communication with detection circuit 88 to receive input signals therefrom indicative of a condition of the capacitors 62, 64. The protection relay 106 may, in one embodiment, be in the form of a double pole single throw electromagnetic relay whose contacts 108 are open and closed responsive to passing of an electric current through a coil 110 thereof—although it is recognized that other suitable relay configurations could be utilized. The protection relay 106 may be normally open and, when the protection relay 106 receives a signal from the detection circuit 88 indicating that one or more of the capacitors 62, 64 are in a short circuit condition, the coil of the protection relay 106 is energized so as to cause the protection relay 106 to switch to a closed position and thereby short circuit the DC link 58 directly. By shorting the DC link 58, all DC link capacitors 62, 64 are short circuited, with energy thereby being diverted from the capacitors 62, 64 and eliminating the risk of the capacitors exploding or starting on fire due to an uncontrolled overvoltage therethrough.

In a second embodiment, and as shown in FIG. 6, the action circuit 90 may include a protection relay 112 (RY2) and a control circuit 114 for controlling of brake chopper 74, with the protection relay 112 being arranged in series with the brake chopper 74. Each of the protection relay 112 and the control circuit 114 is in operable communication with detection circuit 88 to receive action signals therefrom indicative of a condition of the capacitors 62, 64. The control circuit 114 is additionally in operable communication with the solid state switch (e.g., IGBT) 76 of brake chopper 74 to control a switching state thereof. When the protection relay 112 receives a signal from the detection circuit 88 indicating that one or more of the capacitors 62, 64 are in a short circuit condition, the protection relay 112 is energized so as to cause the protection relay 112 to switch to a closed position. At the same time, when the control circuit 114 receives a signal from the detection circuit 88 indicating that one or more of the capacitors 62, 64 are in a short circuit condition, the control circuit 114 switches on the IGBT 76 of the brake chopper 74. Accordingly, upon a closing of the protection relay 112 and a switching on of the IGBT 76 of the brake chopper 74, a short circuit is created across the DC link 58. Beneficially, as the protection relay 112 and the brake chopper 114 are arranged in series, they share the voltage across the DC link 58 (e.g., share 650 V) upon creation of the short circuit, such that a smaller protection relay 112 can be employed (as compared to the protection relay 106 in the embodiment of FIG. 5) and the cost thereof can be reduced.

In a third embodiment, and as shown in FIG. 7, the action circuit 90 may include a logic control circuit 116 operably connected to the inverter 80 to control switching of the IGBTs 82 therein. The logic circuit 116 is in operable communication with detection circuit 88 to receive input signals (i.e., action signals) therefrom indicative of a condition of the capacitors 62, 64. When the logic circuit 116 receives an action signal from detection circuit 88, the logic circuit 116 transmits gating signals to two IGBTs 82 arranged in series on a same leg 118 of the inverter 80 at the same time so as to cause the two IGBTs 82 to turn on simultaneously—thereby short circuiting the DC link 58. While FIG. 7 illustrates that logic circuit 116 is operably connected to just the two IGBTs 82 in leg 118 to control switching thereof, it is recognized that the IGBTs 82 on two of the inverter legs 118 or all three of the inverter legs 118 could be turned on at the same time to short circuit the DC link 58. The number of IGBTs 82 in inverter 80 turned on by logic circuit 116 responsive to the action signal generated by detection circuit 88 can be controlled in order to vary the current across the IGBTs 82 of the inverter 80 and thereby control/limit the damage done to the IGBTs 82, as desired by an operator.

Figure 8:
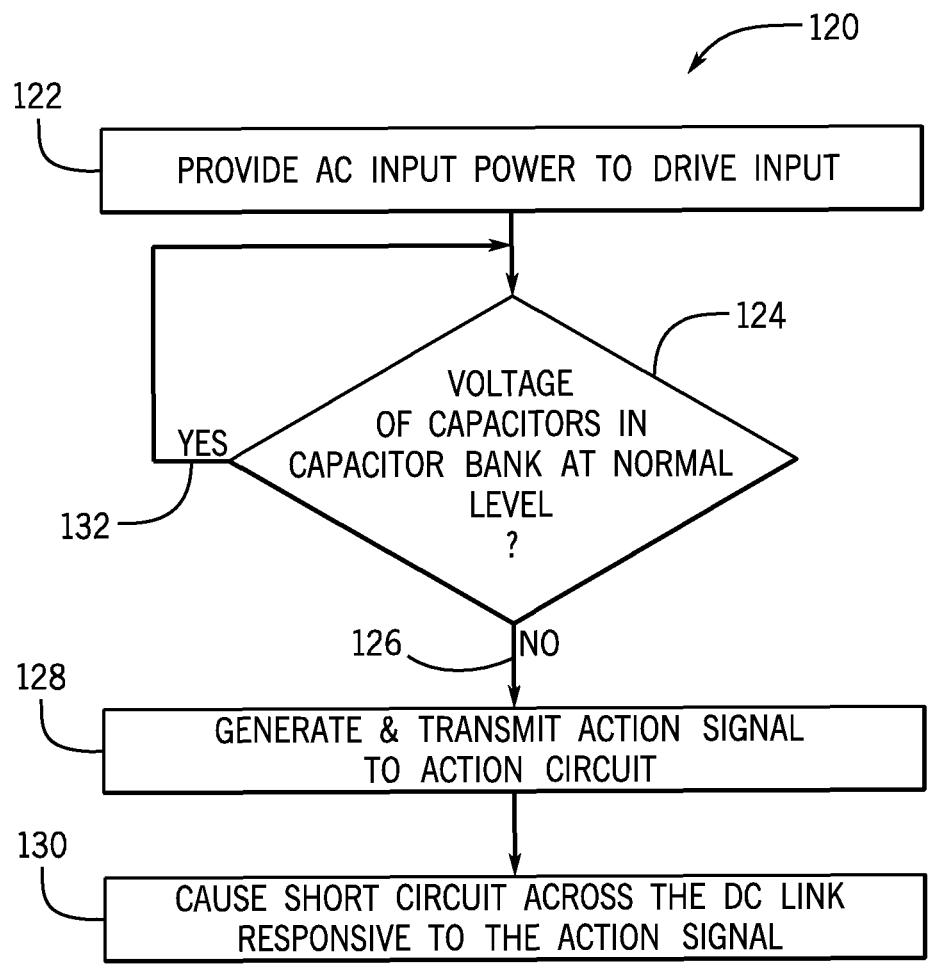
FIG. 8 is a flowchart illustrating a technique for controlling the ASD circuit of FIG. 2, according to an embodiment of the invention.

Referring now to FIG. 8, and with reference back to FIG. 2, a technique 120 for controlling ASD circuit 46 is shown, with the technique being performed by the protection circuit 86 (detection circuit 88 and action circuit 90) of ASD circuit 46 and the various components and circuits comprising the protection circuit, as described above with respect to FIGS. 3-7, according to embodiments of the invention. Process 120 starts at STEP 122 when an AC input power is applied at drive input 50—such as at the start of ASD circuit 46. The providing of AC input power at STEP 122 may be performed as part of a normal operation of ASD circuit 46 or may be as part of a breakdown of components testing of ASD circuit 46.

Upon a supplying of AC input power at drive input 50, a determination is made at STEP 124 regarding whether the capacitor voltages are normal (i.e., whether DC link capacitor bank 60 has a shorted capacitor)—with such determination being made via detection circuit 88. The determination at STEP 124 is either based on whether any measured capacitor voltage has exceeded a pre-determined voltage limit/threshold (acquired by sensors 102, 104 and as defined in a logic circuit 100, or based on a pulling to ground of one of opto-couplers 92) or based on whether a difference between capacitor voltages has exceeded a voltage limit/threshold (acquired by sensors 102, 104 and as defined in a logic circuit 100). If it is determined at STEP 124 that any of the measured capacitor voltages are abnormal, as indicated at 126, detection circuit 88 generates an action signal and transmits this action signal to action circuit 90 at STEP 128. Transmission of the action signal to action circuit 90 causes the action circuit 90 to control one or more components in the ASD circuit 46 in a manner that causes a short circuit across the DC link 58 at STEP 130. In one embodiment, and as shown in FIG. 5, the action signal generated/transmitted at STEP 130 causes a protection relay 106 of the action circuit 90 to switch to a closed position and thereby short circuit the DC link 58 directly. In another embodiment, and as shown in FIG. 6, the action signal generated/transmitted at STEP 130 causes a protection relay 112 of the action circuit 90 to switch to a closed position and simultaneously causes a control circuit 114 of the action circuit 90 to switch on the IGBT 76 of the brake chopper 74 such that, upon a closing of the protection relay 112 and a switching on of the IGBT 76 via control circuit 114, a short circuit is created across the DC link 58. In yet another embodiment, and as shown in FIG. 7, the action signal generated/transmitted at STEP 130 causes a logic circuit 116 of the action circuit 90 to transmit gating signals to two IGBTs 82 in the same leg 118 of the inverter 80 (or the IGBTs of more than one leg of the inverter) at the same time so as to cause the two IGBTs 82 to turn on simultaneously, and thereby create a short circuit across the DC link 58. By shorting the DC link 58, all DC link capacitors 62, 64 are short circuited, with energy thereby being diverted from the capacitors and eliminating the risk of the capacitors exploding or starting on fire due to an uncontrolled overvoltage therethrough.

Referring still to FIG. 8, if detection circuit 88 instead determines at STEP 124 that all of the measured capacitor voltages are normal, as indicated at 132, it is then considered that capacitors 62, 64 are in a proper working order and no short circuit condition is present, and that ASD circuit 46 may thus be safely operated. Accordingly, technique 120 returns to STEP 124 and continues to monitor the capacitor voltage(s) for identification of any future fault.

Figure 9:
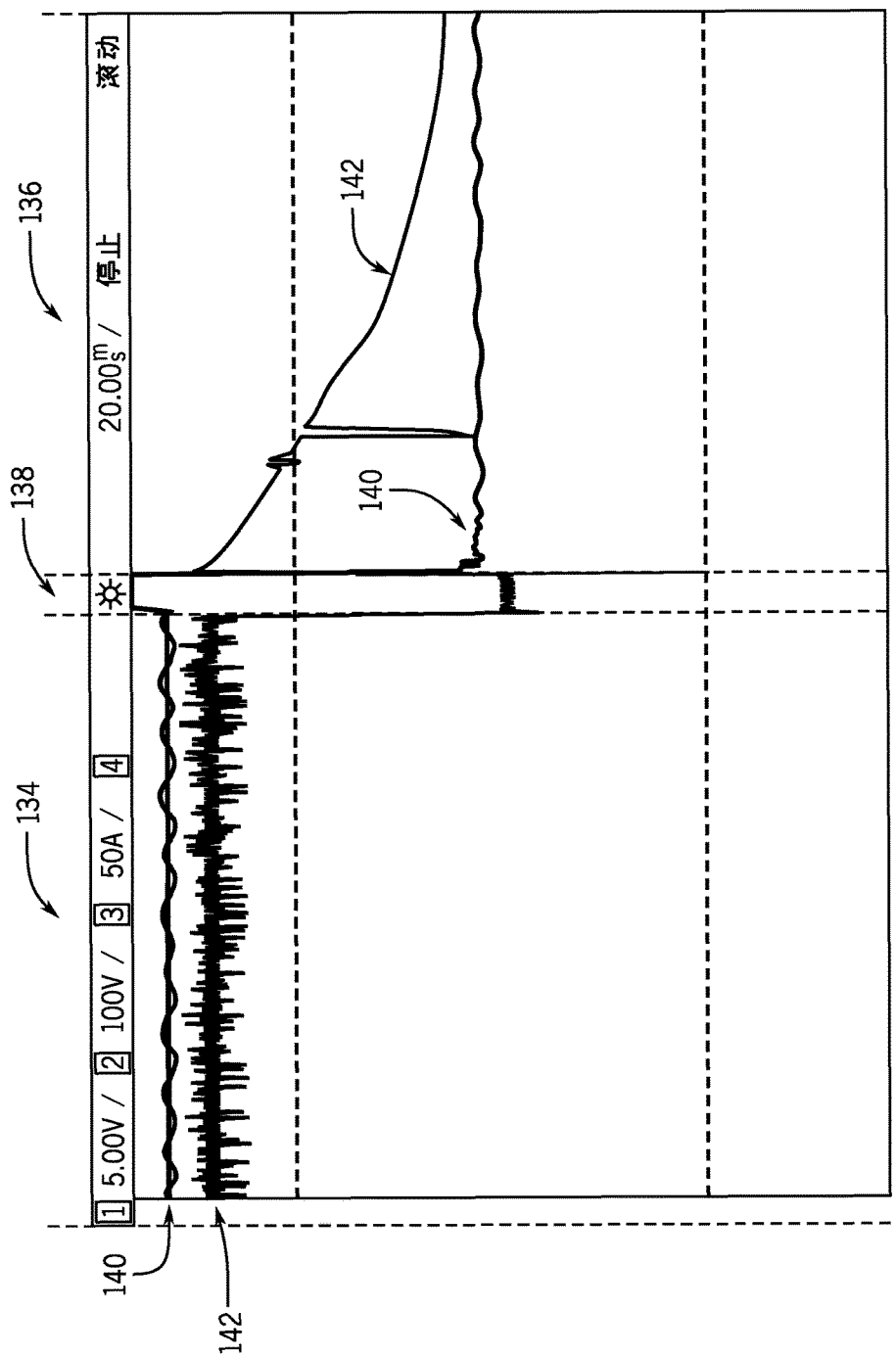
FIG. 9 is a graph illustrating the operation of the ASD circuit of FIG. 2 upon detection of a capacitor short condition, according to an embodiment of the invention.

Referring now to FIG. 9, with reference back to FIG. 2, a graph illustrating the operation of ASD circuit 46 upon detection of a capacitor short condition is shown according to an exemplary embodiment of the invention. In the graph, the detection and protections steps performed are via a detection circuit 88 and action circuit 90 as illustrated in FIGS. 3 and 5, respectively, i.e., via opto-couplers 92 and a protection relay 106, but it is recognized that graphs illustrating the operation of ASD circuit 46 upon detection and interruption of a capacitor short condition via other detection and action circuits 88, 90 could similarly be generated.

The graph of FIG. 9 shows the operation of ASD circuit 46 during a normal operating state 134, a short circuit state 136, and a switching period 138 in between. Additionally, the graph includes two lines: a capacitor voltage line 140 showing the voltage across capacitor 62 of capacitor bank 60 and an opto-coupler signal line 142 showing the drive signal of an opto-coupler 92. Capacitor voltage line 140 shows that the voltage across capacitor 62 was normal, and then capacitor 62 developed an overvoltage condition at the end of the normal operating state 134. At that point, the opto-coupler 92 of detection circuit 88 detected a short circuit in capacitor 62 and, responsive thereto, generated a driver or action signal indicating that a short circuit condition in capacitor 62 was present. The driver signal is provided to protection relay 106 so as to cause the protection relay 106 to begin switching to the ON state during switching period 138, which as shown in the embodiment of FIG. 9, may be a period of 7 ms, for example. At the start of short circuit state 136, protection relay 106 is in the closed state, such that a short circuit is created across the DC link 58 and the voltage across the capacitor 62 drops significantly, as can be seen via the capacitor voltage line 140 in FIG. 9. More specifically, at the start of short circuit state 136, a short circuit is created across the DC link 58, thereby causing a breakdown of the rectifier bridge 54 and causing a disconnection of the ASD circuit 46 from the input AC power.

Beneficially, embodiments of the invention thus provide an ASD circuit having built-in protections against a short circuit caused by a shorted capacitor in a DC link capacitor bank. The ASD circuit includes a protection circuit comprising a detection circuit and an action circuit that function to detect a short circuit in the DC link capacitor bank and interrupt the short circuit to provide overvoltage protection to the capacitors. The detection circuit generates an action signal upon detection of a short circuit in the capacitors and transmits the action signal to the action circuit, with the action circuit operating to short circuit the DC link, so as divert energy from the capacitor bank and limit the damage thereto by preventing the capacitors from exploding or starting on fire due to an uncontrolled overvoltage therethrough. The incorporation of the protection circuit into the ASD circuit thus provides an effective solution to limit damage to the ASD circuit from a capacitor short, with the protection circuit allowing for the ASD circuit to meet the requirements of the UL61800-5-1 breakdown of components test.

According to one embodiment of the present invention, an ASD circuit includes an input connectable to an AC source, a rectifier bridge connected to the input to convert an AC power input to a DC power, a DC link coupled to the rectifier bridge to receive the DC power therefrom, a DC link capacitor bank comprising at least first and second capacitors connected to the DC link, each capacitor of the DC link capacitor bank having a capacitor voltage thereacross, and a protection circuit including a detection circuit configured to detect a short circuit on one or more of the first and second capacitors of the DC link capacitor bank and generate an action signal upon detection of a short circuit on one or more of the first and second capacitors of the DC link capacitor bank. The ASD circuit also includes an action circuit in operable communication with the detection circuit and configured to cause a short circuit across the DC link upon receiving the action signal from the detection circuit.

According to another embodiment of the present invention, a method of operating an adjustable speed drive (ASD) circuit that comprises a rectifier, a DC link having a DC link capacitor bank with first and second capacitors, a protection circuit, and an inverter is provided. The method includes receiving an AC power at an input of the ASD circuit, providing the AC power to the rectifier to convert the AC power to a DC power on the DC link, detecting a short circuit on a capacitor of the DC link capacitor bank via a detection circuit of the protection circuit, generating an action signal via the detection circuit upon detection of a short circuit on a capacitor of the DC link capacitor bank, and causing a short circuit across the DC link via an action circuit of the protection circuit responsive to receiving the action signal at the action circuit.

According to yet another embodiment of the present invention, an ASD circuit includes a rectifier bridge and a DC link coupled to the rectifier bridge to receive a DC link voltage therefrom, the DC link having a DC link capacitor bank thereon that includes at least two capacitors. The ASD circuit also includes a protection circuit having a detection circuit and an action circuit. The detection circuit is configured to sense a voltage across one or more of the at least two capacitors, determine if the sensed voltage across the one or more of the at least two capacitors crosses a voltage threshold, and generate an action signal upon determining that the sensed voltage across the one or more of the at least two capacitors has crossed the voltage threshold, wherein generation of the action signal indicates that a capacitor short circuit is present on one or more of the at least two capacitors. The action circuit is configured to cause a short circuit across the DC link upon receiving the action signal from the detection circuit, the short circuit across the DC link diverting energy from the at least two capacitors so as to limit damage thereto resulting from the capacitor short circuit.

The present invention has been described in terms of the preferred embodiment, and it is recognized that equivalents, alternatives, and modifications, aside from those expressly stated, are possible and within the scope of the appending claims.

What is claimed is:

1. An adjustable speed drive (ASD) circuit comprising:
an input connectable to an AC source;
a rectifier bridge connected to the input to convert an AC power input to a DC power;
a DC link coupled to the rectifier bridge to receive the DC power therefrom;
a DC link capacitor bank comprising at least first and second capacitors connected to the DC link, each capacitor of the DC link capacitor bank having a capacitor voltage thereacross; and
a protection circuit comprising:
a detection circuit configured to:
detect a short circuit on one or more of the first and second capacitors of the DC link capacitor bank; and
generate an action signal upon detection of a short circuit on one or more of the first and second capacitors of the DC link capacitor bank; and
an action circuit in operable communication with the detection circuit and configured to cause a short circuit across the DC link upon receiving the action signal from the detection circuit.

2. The ASD circuit of claim 1 wherein the detection circuit comprises:
a first opto-coupler operably connected to the first capacitor; and
a second opto-coupler operably connected to the second capacitor;
wherein, upon occurrence of a short circuit in one or more of the first and second capacitors, an output of a respective one of the first and second opto-couplers whose capacitor has short circuited is pulled to ground, so as to cause the respective one of the first and second opto-couplers to generate and transmit the action signal to the action circuit indicating the presence of a short circuit in the DC link capacitor bank.

3. The ASD circuit of claim 1 wherein the detection circuit comprises:
a voltage sampling circuit that measures a capacitor voltage across at least one of the first and second capacitors; and
a logic circuit that receives the measured capacitor voltage from the voltage sampling circuit, the logic circuit programmed to:
compare the measured capacitor voltage across the at least one of the first and second capacitors to one or more voltage thresholds; and
when the measured capacitor voltage across the at least one of the first and second capacitors crosses the one or more voltage thresholds, generate and transmit an action signal to the action circuit indicating the presence of a short circuit in the DC link capacitor bank.

4. The ASD circuit of claim 3 wherein the one or more voltage thresholds comprises at least one of a capacitor overvoltage condition threshold, a capacitor undervoltage condition threshold, and a capacitor voltage difference threshold comprising a voltage difference between the first capacitor voltage and the second capacitor voltage.

5. The ASD circuit of claim 1 wherein the action circuit comprises a protection relay coupled to positive and negative rails of the DC link, the protection relay being in a normally open state and configured to close upon receiving the action signal from the detection circuit, with the closing of the protection relay causing the short circuit across the DC link.

6. The ASD circuit of claim 1 further comprising a brake chopper configured to discharge the DC link capacitor bank in a controlled manner, the brake chopper comprising a solid state switching device operable in on and off states;
wherein the action circuit comprises:
a protection relay arranged in series with the brake chopper and coupled to the brake chopper and a rail of the DC link, the protection relay being in a normally open state and configured to close upon receiving the action signal from the detection circuit; and
a control circuit operably connected to the solid state switching device of the brake chopper and configured to turn on the solid state switching device upon receiving the action signal from the detection circuit; and
wherein the closing of the protection relay and the turning on of the solid state switching device of the brake chopper cause the short circuit across the DC link.

7. The ASD circuit of claim 1 wherein, in closing the protection relay and turning on the solid state switching device of the brake chopper, a voltage on the DC link is shared by the protection relay and the solid state switching device of the brake chopper when the short circuit is caused across the DC link.

8. The ASD circuit of claim 1 further comprising an inverter coupled to the DC link and configured to invert a DC link voltage to an AC output voltage, the inverter comprising a plurality of legs each including a pair of solid state switching devices arranged in series; and wherein the action circuit comprises a logic circuit in operable communication with the detection circuit and the inverter, the logic circuit programmed to simultaneously turn on the pair of solid state switching devices on at least one of the plurality of legs upon receiving the action signal from the detection circuit, with the turning on of the pair of solid state switching devices causing the short circuit across the DC link.

9. The ASD circuit of claim 1 wherein, in causing a short circuit across the DC link, the action circuit diverts energy from the DC link capacitor bank so as to limit damage thereto.

10. A method of operating an adjustable speed drive (ASD) circuit that comprises a rectifier, a DC link having a DC link capacitor bank with first and second capacitors, a protection circuit, and an inverter, the method comprising:
receiving an AC power at an input of the ASD circuit;
providing the AC power to the rectifier to convert the AC power to a DC power on the DC link;
detecting a short circuit on a capacitor of the DC link capacitor bank via a detection circuit of the protection circuit;
generating an action signal via the detection circuit upon detection of a short circuit on a capacitor of the DC link capacitor bank; and
causing a short circuit across the DC link via an action circuit of the protection circuit responsive to receiving the action signal at the action circuit.

11. The method of claim 10 wherein detecting the short circuit on a capacitor of the DC link capacitor bank via the detection circuit comprises:
operably connecting a first opto-coupler to a first capacitor of the DC link capacitor bank and a second opto-coupler to a second capacitor of the DC link capacitor bank; and
causing an output of one of the first and second opto-couplers to be pulled to ground when its respective capacitor of the first and second capacitors is short circuited, thereby indicating detection of the short circuit.

12. The method of claim 10 wherein detecting the short circuit on a capacitor of the DC link capacitor bank via the detection circuit comprises:
measuring a capacitor voltage across at least one of the first and second capacitors in the DC link capacitor bank via a voltage sampling circuit;
comparing the measured capacitor voltage across the at least one of the first and second capacitors to one or more voltage thresholds via a logic circuit; and
detecting the short circuit when the measured capacitor voltage across the at least one of the first and second capacitors crosses the one or more voltage thresholds.

13. The method of claim 12 wherein the one or more voltage thresholds comprises at least one of a capacitor overvoltage condition threshold, a capacitor undervoltage condition threshold, and a capacitor voltage difference threshold comprising a voltage difference between the first capacitor voltage and the second capacitor voltage.

14. The method of claim 13 wherein causing the short circuit across the DC link via the action circuit comprises closing a protection relay coupled to positive and negative rails of the DC link upon receiving the action signal from the detection circuit, with the closing of the protection relay causing the short circuit across the DC link.

15. The method of claim 10 wherein causing the short circuit across the DC link via the action circuit comprises:
turning on a solid state switching device of a brake chopper in the ASD circuit via a control circuit of the action circuit, upon the control circuit receiving the action signal from the detection circuit; and
closing a protection relay coupled to a rail of the DC link and to the brake chopper upon receiving the action signal from the detection circuit, the protection relay arranged in series with the brake chopper; and
wherein the closing of the protection relay and the turning on of the solid state switching device of the brake chopper is performed simultaneously so as to cause the short circuit across the DC link.

16. The method of claim 10 wherein causing the short circuit across the DC link via the action circuit comprises operating a logic circuit of the action circuit to simultaneously turn on a pair of solid state switching devices arranged in series on a leg of the inverter upon receiving the action signal from the detection circuit, with the turning on of the pair of solid state switching devices causing the short circuit across the DC link.

17. The method of claim 10 wherein the ASD circuit is operated as part of a breakdown of components test.

18. An adjustable speed drive (ASD) circuit comprising:
a rectifier bridge;
a DC link coupled to the rectifier bridge to receive a DC link voltage therefrom, the DC link having a DC link capacitor bank thereon that includes at least two capacitors; and
a protection circuit comprising:
a detection circuit configured to:
sense a voltage across one or more of the at least two capacitors;
determine if the sensed voltage across the one or more of the at least two capacitors crosses a voltage threshold; and
generate an action signal upon determining that the sensed voltage across the one or more of the at least two capacitors has crossed the voltage threshold;
wherein generation of the action signal indicates that a capacitor short circuit is present on one or more of the at least two capacitors; and
an action circuit configured to cause a short circuit across the DC link upon receiving the action signal from the detection circuit, the short circuit across the DC link diverting energy from the at least two capacitors so as to limit damage thereto resulting from the capacitor short circuit.

19. The ASD circuit of claim 18 wherein the detection circuit comprises one of:
an opto-coupler operably connected to each of the at least two capacitors, with each opto-coupler having an output that is pulled to ground when its respective capacitor is short circuited, thereby causing the opto coupler to generate the action signal; or
a voltage sensing circuit and logic circuit arrangement configured to generate and transmit the action signal to the action circuit when it is determined that the sensed voltage across the one or more of the at least two capacitors has crossed the voltage threshold.

20. The ASD circuit of claim 18 wherein the action circuit comprises one of:
   a protection relay coupled to positive and negative rails of the DC link, the protection relay being in a normally open state and configured to close upon receiving the action signal from the detection circuit, with the closing of the protection relay causing the short circuit across the DC link;
   a protection relay and control circuit arrangement, wherein the protection relay is arranged in series with a brake chopper of the ASD circuit and is configured to close upon receiving the action signal from the detection circuit, and wherein the control circuit is operably connected to a solid state switching device of the brake chopper and configured to turn on the solid state switching device upon receiving the action signal from the detection circuit, with the closing of the protection relay and the turning on of the solid state switching device of the brake chopper causing the short circuit across the DC link; or
   a logic circuit in operable communication with an inverter of the ASD circuit, the logic circuit programmed to simultaneously turn on a pair of solid state switching devices on a leg of the inverter upon receiving the action signal from the detection circuit, with the turning on of the pair of solid state switching devices causing the short circuit across the DC link.

\* \* \* \* \*